United States Patent [19]

Heuel et al.

[11] Patent Number: 4,942,080

[45] Date of Patent: Jul. 17, 1990

[54] COMPOSITE MATERIAL FOR VIBRATION DAMPING AND STRUCTURAL SOUND DAMPING

[75] Inventors: Wolfgang Heuel, Dortmund; Jobst H. Meyer Zu Bexten, Soest-Ostönnen; Rainer Müller, Unna; Klaus Stamm, Dortmund, all of Fed. Rep. of Germany

[73] Assignee: Hoesch Stahl Aktiengesellschaft, Fed. Rep. of Germany

[21] Appl. No.: 318,838

[22] Filed: Mar. 6, 1989

Related U.S. Application Data

[63] Continuation-in-part of Ser. No. 152,667, Feb. 5, 1988, abandoned.

[30] Foreign Application Priority Data

Feb. 13, 1987 [DE] Fed. Rep. of Germany ....... 3704506

[51] Int. Cl.[5] .......................... B32B 7/02; B32B 15/08
[52] U.S. Cl. ..................................... 428/212; 428/213; 428/457
[58] Field of Search ............... 428/457, 461, 458, 212, 428/213

[56] References Cited

U.S. PATENT DOCUMENTS

| | | | |
|---|---|---|---|
| 4,223,073 | 9/1980 | Caldwell et al. | 428/461 X |
| 4,599,261 | 7/1986 | Hart et al. | 428/461 X |
| 4,717,624 | 1/1988 | Ikenaga et al. | 428/457 X |
| 4,756,970 | 7/1988 | Brandyberry et al. | 428/457 X |
| 4,849,293 | 7/1989 | Koga et al. | 428/458 X |

Primary Examiner—Thomas J. Herbert
Attorney, Agent, or Firm—Thomas S. Baker, Jr.

[57] ABSTRACT

To extend the temperature range of composite materials the composite material is made up of more than two hard layers which are joined with thin intermediate layers of viscoelastic material where one intermediate layer differs from another intermediate layer in that its softening range lies in a different temperature range so that the damping ranges of the intermediate layers also are different.

10 Claims, 1 Drawing Sheet

COMPOSITE MATERIAL FOR VIBRATION DAMPING AND STRUCTURAL SOUND DAMPING

This Application is a Continuation-In-Part of Ser. No. 07/152,667 now abandoned filed Feb. 5, 1988.

The invention relates to a composite material for vibration damping and structural sound damping in which layers of hard material are bonded together by a viscoelastic intermediate layer.

It is known from EP 167,455 that the vibration-damping properties of a composite material are adequate only for a specific temperature range and that this range may be shifted to higher or lower temperature if an intermediate viscoelastic layer having a material with a softening range lying at higher temperatures or at lower temperatures is inserted between the rigid sheets of the composite material. The material for the viscoelastic intermediate layer consists usually of plastic or similar organic materials to which dust-like or fibrous fillers also may be added.

These known composite materials fail in uses where both very low and very high operating temperatures occur. The most suitable plastics have a maximum temperature range of 50 C. in which they have adequate damping.

However, for some items such as oil sumps of motor vehicles a broad temperature range of operation of 0° C. to 130° C. occurs. Thus, the working range of a composite having a single viscoelastic layer would not be suitable for use in this application.

Attempts have been made to obtain a greater working range of the composite materials by mixing different plastics having different working ranges and using the mixture as a single damping layer. This has not given the desired result in terms of vibration and sound damping.

Vibration and sound damping effectiveness may be measured in terms of "loss factor" which may be defined as follows:

(A) For forced stationary oscillations of a sine exciting damped oscillation system (note FIG. A):

$$d_k = \frac{E_v}{\pi \cdot E_r}, \text{ where}$$

$E_v$=Energy converted into thermal energy (lost energy) by internal friction during one oscillation period;

$E_r$=Mechanical energy accumulated in the oscillation system (reversible or recoverable energy)

$\pi = 3.14159$ (B) For free, evanescent oscillations of a damped oscillation system (note FIG. B):

$$d = \frac{\Lambda}{\pi°/_{\infty}} \text{ using } \Lambda = \ln\left(\frac{A_n}{A_{n+1}}\right), \text{ where}$$

$\Lambda$="logarithmic decrement", $A_n$ and $A_{n+1}$=oscillation amplitudes of two successive oscillations (displaced on phase for a period $t_p$), ln = natural logarithm,
= 3,14159...

Preferably for suitable sound the vibration damping the composite would have a loss factor greater than or equal to 0.10.

Where it is possible to prepare a workable mixture in the first place, the mixture acts in terms of loss factor measurement, like a new quasi-homogeneous material with its own maximum damping occurring at its own temperature position between the temperature position values for maximum damping of the starting plastics' temperature. This mixture has its own and not necessarily greater width of temperature working ranges for vibration and sound damping.

Another approach which has proved unsuitable is laminating two or more plastics over each other without an intermediate layer therebetween as for example, a composite or multi-layer viscoelastic sheet. One reason for the failure of this approach may be that if miscibility is present at higher temperatures, when one of the individual layers melts, a mixture results so that the desired objective is not achieved. However, even in a case where at higher use temperatures no mixing of the composite layers occurs the desired result is still not achieved in so far as damping over a broad temperature range is concerned. This is because at a high temperature the mass used for the lower temperature already has such a low viscosity that it cannot introduce the shearing forces into the other plastic layer necessary for the conversion of the vibration energy to thermal energy $E_v$ necessary to raise the loss factor even if the other plastic layer is in the correct rheological or viscous state. Note; the correct or ideal rheological state of a plastic or viscoelastic layer may be defined as that within the main softening temperature range $\Delta T$, in which the loss factor is equal to or greater than 0.10.

Also, it has been found to be almost impossible to obtain damping extending over a large temperature range by mechanically coupling two independent composite materials with different damping ranges to obtain an addition of the two ranges. Such a coupling would be conceivable in a structure such as an engine cowling. For example, it would be possible to make the engine cowling or enclosure double, with an inner lining suitable for damping sound and vibration at high temperatures and an outer lining suitable for damping at low temperatures. However, the double construction of the aforementioned engine cowling would be difficult to manufacture because support spacers would have to be installed between the inner and outer cowling. Such construction also would reduce the effect of the sound absorption. Coupling of two or more independent composite materials would not be suitable for use in motor-car bottom plates, oil sumps and other applications where significant quantities of heat must be transferred and because of lack of space.

DESCRIPTION OF THE PREFERRED EMBODIMENT

Figure 2:
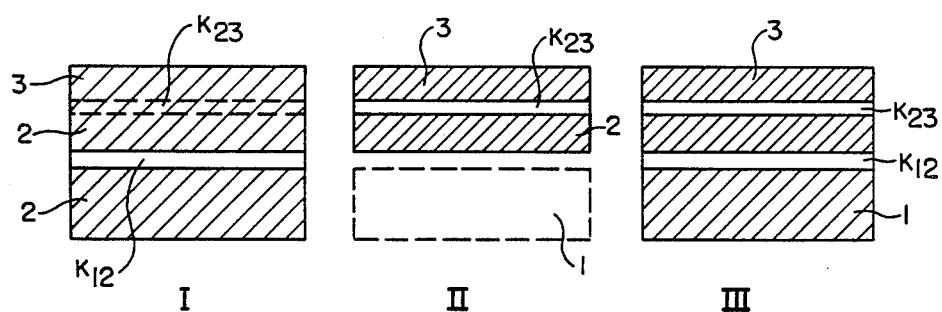
FIG. 2 illustrates the operable viscoelastic layer of the laminate of the present invention.

Turning to FIG. 2, the laminate or composite material of the present invention comprises three rigid or hard, temperature stable layers or sheets which may be formed of steel 1, 2, 3 which are separated by layers of viscoelastic material K12 and K23 which viscoelastic materials have different "correct" rheological or viscous states. In other words, the viscoelastic materials have different main softening temperature ranges within which the loss factor for vibration and sound damping would be acceptably high. As stated above, an acceptable loss factor would be one which is greater than or equal to 0.10. The rigid layers may be think sheet steel, electrolytically purified or hot dipped sheet steel, aluminum sheet or other such materials.

In the composite of the present invention depicted in FIG. 2, the viscoelastic layer K 12 has a main softening range in which the loss factor would be within a range for suitable damping lower than the main softening temperature range for the viscoelastic material K 23. It should be noted that the viscoelastic layer K 12 separates the rigid sheets of material 1 and 2 whereas the viscoelastic layer K 23 separates the rigid sheets of material 2 and 3.

As mentioned above, different viscoelastic layers have different main softening temperature ranges. For example, a viscoelastic layer having a main softening temperature range of 250° to 310° K. would include copolymers of vinyl acetate and alkyl maleic acid to which a softening agent such as phthalate or a phosphoric ester or other ester has been mixed therewith or applied thereto; A copolymer of alkyl acrylate or alkyl methacrylate with different alkyl groups; Natural resin and its compounds such as colophonium and residues of mineral oil distillation, particularly bituminous substances and blown bitumen which are formed from mixing with natural and synthetic caoutchouc substances. Viscoelastic layers having intermediate softening ranges of between 290° and 350° K. may be manufactured using the materials stated for the lower softening range with differently mixed softening agents or through the use of smaller amounts of softening agents. Viscoelastic layers having higher main softening temperature ranges of between 340° and 410° K. may be manufactured from polyethylene which may have its contact surface activated by oxidation to improve its adhesive strength ("PE-foil"); a copolymer of ethylene and acrylate ("EAA-foil") which may have alkyl acrylates as auxiliary components; a copolymer of ethylene and vinyl acetate ("EVA-foil") which may have complementary mixtures of different copolymers of that type; and polymers and copolymers as described above, but using propylene in lieu of ethylene as a polymerisation component to form "PP-foil, PAA-foil, PVA foil".

Figure 1:
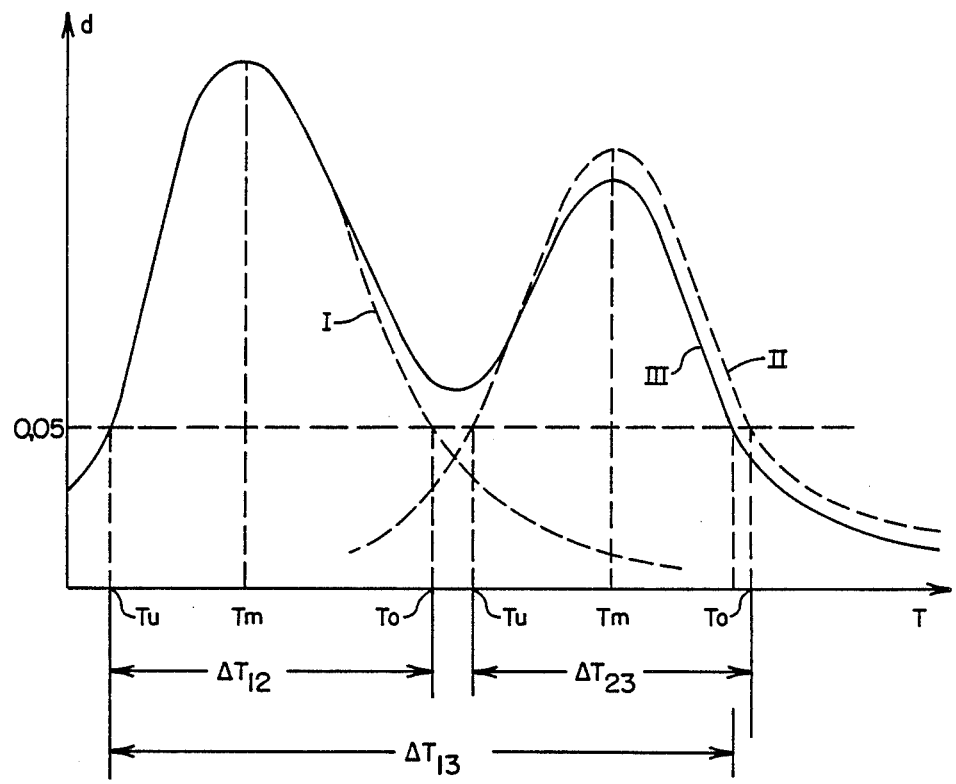
FIG. 1 shows loss factor as a function of temperature for the laminate or composite material of the present invention.

Turning to FIG. 1, the X axis of the graph depicts temperature which increases from left to right whereas the Y axis depicts loss factor which increase with distance from the intersection of the X and Y axis. In FIG. 1 the dotted line I represents the change of loss factor with respect to temperature for layer K 12. It may be seen that the main softening range for the viscoelastic layer K 12 covers the temperature range $\Delta T$ 12. For this material the loss factor begins at 0.05 at temperature $T_u$, obtains a maximum well in access of 0.10 at $T_o$, and returns to 0.05 at $T_m$.

In the temperature range $\Delta T$ 12, the two steel sheets 2 and 3 act like a single thick or rigid sheet because the viscoelastic intermediate layer K 23 indicated in dashed lines at FIG. 2 I is very hard at this temperature and relatively inelastic. Accordingly, the damping for the laminate is effected by the intermediate viscoelastic layer K 12.

At elevated temperatures, damping of the laminate over the temperature range $\Delta T23$ is effected by the viscoelastic material K 23 whose change of loss factor with respect to change of temperature has been illustrated in dashed lines by II. It may be observed that viscoelastic material K 23 has a loss factor of 0.05 at temperature $T_u$, obtains a maximum loss factor well in excess of 0.10 at $T_m$ and thereafter exhibits a loss factor of 0.05 at temperature $T_o$.

In the temperature range depicted as $\Delta T$ 23, the mass of the rigid sheet 1 would be coupled to the remainder of the laminate by the viscoelastic layer K 12 which in this temperature range would be almost a fluid. In this state the viscoelastic material K 12 effects little, if any, damping and the rigid layer 1 would be effectively decoupled from the system.

Turning again to FIG. 1, it may be seen that the laminate of the present invention has been manufactured in an embodiment in which the viscoelastic layers K 12 and K 23 are selected such that they exhibit favorable rheological states for immediately adjacent temperature ranges $\Delta T$ 12 and $\Delta T$ 23. This then gives the laminate a wide working temperature range, corresponding substantially to the sum of $\Delta T12$ and $\Delta T23$ noted in FIG. 1 as delta T 13. Embodiments also would be possible in which the temperature ranges for the correct rheological states of the viscoelastic layers would be spaced apart such that the laminate would exhibit dampening over two discreet working temperature ranges.

Generally, the material comprising the viscoelastic layers of the laminate is a thermoplast which is self-adhesive by coating it or melting it onto a pretreated surface of an adjacent rigid layer. Hence, an adhesive or bonding agent for the viscoelastic layer would not be necessary. Where an adhesive or bonding agent would be necessary, such an agent must be stable and operable within a wide range of temperatures without adversely affecting the damping properties of the composite structure and must not render the manufacturing process unduly complicated or overly expensive.

The manufacture of the five-layer laminate of the present invention may be effective by utilizing either a discontinuous process of individual plate sheet works or a continuous process utilizing a series of band production lines. Both the discontinuous and continuous processes would include the following steps. The first step would be coating the cover sheet 1 with a viscoelastic layer K 12 by laminating of a hot-melt utilizing a coating method, or covering sheet 1 with a plastic solution utilizing a roll-coating method with subsequent vaporization of the solvent or rolling a plastic foil over rigid layer 1 in a roll coating method. Thereafter, the rigid layer 2 would be laminated onto the viscoelastic coated cover sheet 1 under the influence of heat and pressure. Such pressure may be generated by a pair of cooperating rolls or by means of a press. Subsequently, the second hard layer would be recoated utilizing one of the aforementioned methods. It should be noted that the coating method selected for coating the viscoelastic layers K 12 and K 23 may be different because different types of materials may comprise these layers. Subsequently, the rigid layer 3 would be laminated on the second viscoelastic layer. It should be mentioned that typically the successive layers would be applied sequentially. The lamination of the materials under heat and pressure may be effected either in separate steps for example after application of hard layer 2 and after application of hard layer 3 or in a single step.

One problem that occurs when reaching the upper temperature of the high working range ΔT 23 would be that the viscoelastic material K 13 used for the lower temperature working range, T 12 because of greatly reduced viscosity, would attain the state of a liquid and seep out of the edges of the laminate. This problem may be corrected if necessary by folding, rolling, seam welding or sealing the edges of the laminate.

In the preferred embodiment of the invention the laminate included three rigid steel sheets separated by two viscoelastic layers having different correct rheological states. This invention also may be implemented with more than three rigid sheets which may be steel or other hard material separated by more than two viscoelastic plastic layers. For example, a laminate may comprise four steel sheets which would be held together by three viscoelastic plastic layers. It should be noted that as a rule the viscoelastic intermediate layers are considerably thinner than the layers of hard material.

As an example, in one embodiment of the invention, a satisfactory laminate was formed where two adjacent steel sheets had a thickness of 0.34 mm and the third layer had a thickness of 0.50 mm. In this laminate a viscoelastic plastic layer having a thickness of 0.13 mm separated the two steel sheets having a thickness of 0.34 mm and a viscoelastic plastic layer having a thickness of 0.20 mm separated the steel sheets having thicknesses of 0.34 and 0.50 mm. Additionally, the viscoelastic plastic layers having a thickness of 0.13 mm was an "EAA-foil" including 15% acrylate and 85% polyethylene in the copolymer. This layer was laminated at 420° K. under a low surface pressure between two rolls. The thicker viscoelastic layer having a thickness of 0.20 mm was formed from a copolymer of acrylates. This layer was applied to the second rigid layer with a wet film thickness of 330 μm ambient temperature in a 60% solution in ethanol by means of coating rolls. Thereafter the solvent was vaporized at a temperature ranging between 370° and 470° K. in approximately one to two minutes. Utilizing these viscoelastic layers the laminate of the present invention exhibited a loss factor equal to or greater than 0.05 in the temperature range of 260° K. to 400° K. The loss factor had two peaks well in excess of 0.10 at 295° K. and 360° K.

It has been found that the laminate for composite material according to the present invention exhibits the further advantage of reduced radiation of sound over that of conventional composite materials.

Also, it has been found in that in general the more layers a laminate or composite material comprises, the smaller the bending stiffness of that composite. For example, for the same mass a five layer composite material has a smaller bending stiffness than a three-layer composite material or even a single layer material such as a fine metal sheet. This generality applies particularly in upper temperature ranges. Because of lower bending stiffness it has been observed that lower air-borne sound radiation occurs for five layer laminates than with three layer composite materials which exhibit lower air-borne sound radiation than one-layer of the same weight. Thus, a five layer laminate or composite material may have a lower level of damping and yet still exhibit the same air-borne sound level as a three layer laminate or composite material particularly in the upper temperature ranges of between 70° and 130° C. Because the laminate of the present invention exhibits excellent vibration and sound damping characteristics over a wide temperature range it may be utilized in a wide variety of applications. It may be used for automobile oil sumps and cylinder head covers where the working temperatures may range between 260° and 410° K., for domestic washing machines which may have a temperature range of between 290° and 370° K., for natural gas transmission pipes having an operating temperature range of between 250° and 330° K., in the construction of machines having an operating range of between 250° and 330° K. and in garage doors, roofs and walls of conventional buildings where the temperatures may range between 250° and 330° K.

From the above, it may be seen that the present invention of a laminate having at least three rigid layers separated by intermediate viscoelastic layers having different correct rheological states provides vibration damping and structural sound damping over a broad temperature range.

We claim:

1. Composite material for vibration damping and structural sound damping in which layers of non-resilient material are bonded together by a viscoelastic intermediate layer, characterized in that the composite material consists of more than two non-resilient (1, 2, 3) layers joined in each case by a viscoelastic intermediate layer (K 12, K 23) and the damping ranges or softening ranges of the viscoelastic intermediate layers (K 12, K 23) lie in different temperature ranges.

2. Composite material according to claim 1, characterized in that the layers of non-resilient material (1, 2, 3) consist of sheet steel and the viscoelastic intermediate layers (K 12, K 23) of plastic.

3. Composite material according to claim 1, characterized in that said material consists of three steel sheets (1, 2, 3) bonded with viscoelastic intermediate layers (K 12, K 23).

4. Composite material according to claim 1, characterized in that the damping ranges of the viscoelastic intermediate layers (K 12, K 23) are contiguous with each other.

5. Composite material according to claim 1, characterized in that the damping ranges of the viscoelastic intermediate layers (K12, K 23) partially overlap and at a specific mean temperature the damping range of the viscoelastic intermediate layer (K12) designed for beneath said temperature still has at least 10% to 30% of its maximum damping whilst the damping range of the other viscoelastic intermediate layer (K 23) designed for above said predetermined temperature already has 10% to 30% of its maximum damping.

6. Composite material according to claim 1, characterized in that the damping ranges of the viscoelastic intermediate layers (K12, K23) are spaced apart such that between the damping ranges a damping gap exists in which less than 10% of the maximum effective damping is exerted.

7. Composite material according to claim 1, characterized in that the layers of non-resilient material (1, 2, 3) are of different thicknesses.

8. Composite material according to claim 1, characterized in that the viscoelastic intermediate layers (K 12, K 23) are of different thicknesses.

9. Composite material, according to claim 1, characterized in that the non-resilient material consists of three steel sheets whose thickness ration is approximately 2:1:1, the thickest steel sheet (1) being bonded to the viscoelastic intermediate layer (K 12) which is designed for a lower working temperature than the other intermediate layer.

10. Composite material according to claim 1, characterized in that at least one outer surface of the composite material is coated with a sound-absorbing material.

* * * * *